United States Patent [19]

Barnes

[11] 4,314,406
[45] Feb. 9, 1982

[54] COMBINATION TRANSFER DEPTH GAUGE

[76] Inventor: Gary D. Barnes, 611 Hermitage St., San Jose, Calif. 95134

[21] Appl. No.: 119,089

[22] Filed: Feb. 6, 1980

[51] Int. Cl.³ .............................................. G01B 5/18
[52] U.S. Cl. ................................................ 33/169 B
[58] Field of Search .......... 33/169 R, 169 B, DIG. 12

[56] References Cited

U.S. PATENT DOCUMENTS

| 578,765 | 3/1897 | Nelson | 33/169 R |
| 750,449 | 1/1904 | Gillard | 33/169 B |
| 988,672 | 4/1911 | Stiriss | 33/169 B |
| 2,337,690 | 12/1943 | Stern | 33/169 B |
| 3,120,062 | 2/1964 | Butala | 33/169 R |
| 4,219,937 | 9/1980 | Lorenzini | 33/169 B X |

FOREIGN PATENT DOCUMENTS

| 1126634 | 7/1956 | France | 33/169 B |
| 288872 | 4/1928 | United Kingdom | 33/169 B |

OTHER PUBLICATIONS

Nylon Tipped Set Screws–Sterling Instrument, p. 62, 1971.

Primary Examiner—Harry N. Haroian
Attorney, Agent, or Firm—C. E. Tripp

[57] ABSTRACT

A combination transfer depth gauge capable of measuring the depth of small diameter blind holes in close proximity to the shoulder of a workpiece is made up of a bar stock body having opposed flat end faces and a longitudinal throughbore. One end portion of the body is milled off to provide an offset face that intersects the throughbore. A small gauge wire is slidably mounted in the bore and is clamped to the body by a nylon setscrew.

3 Claims, 8 Drawing Figures

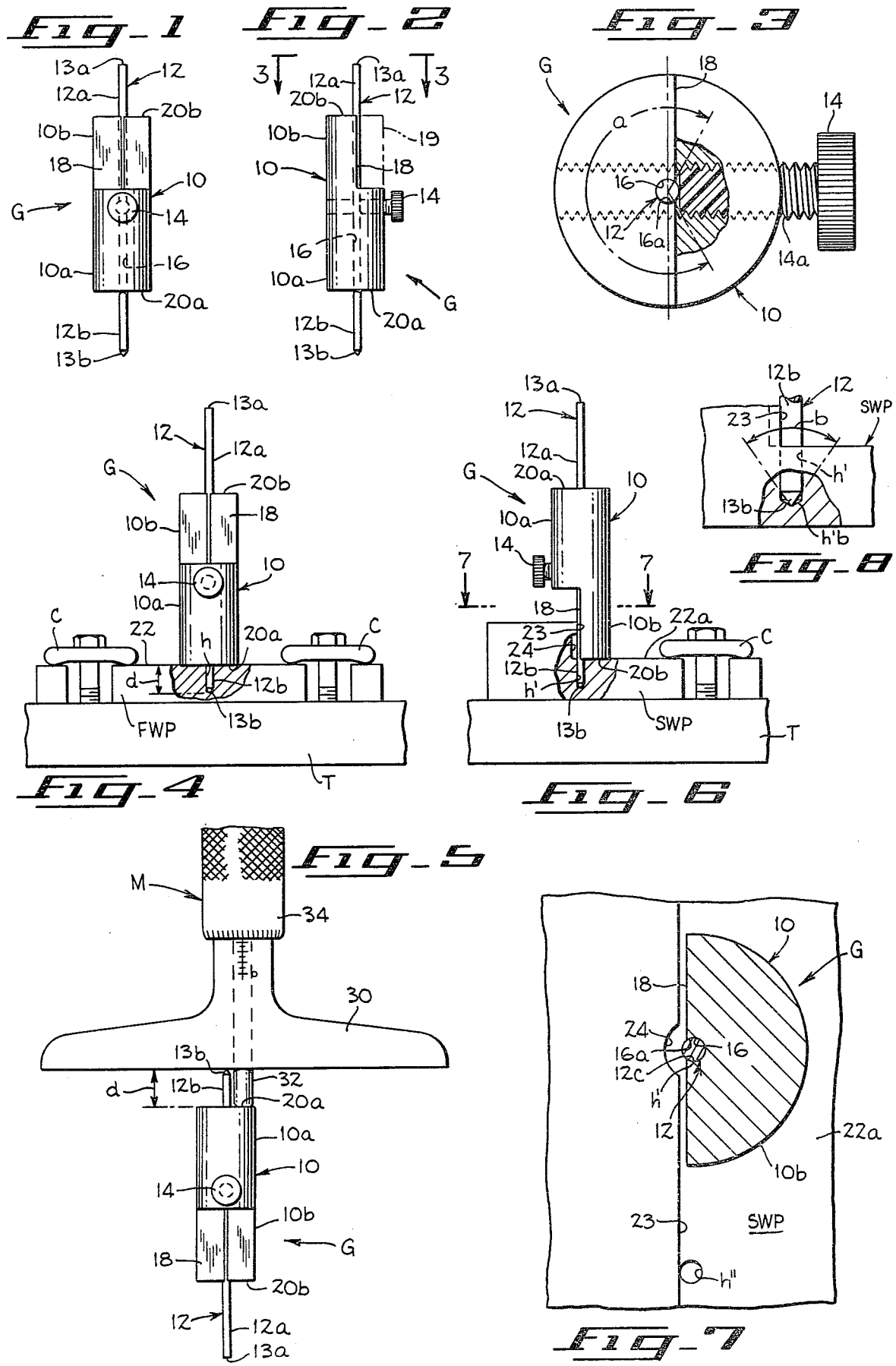

COMBINATION TRANSFER DEPTH GAUGE

FIELD OF THE INVENTION

This invention relates to measuring instruments and more particularly to a depth gauge for finding the depth of small diameter blind bores or holes and particularly to such gauges formed for finding the depth of such holes even when they are disposed tangent to or in close proximity to a shoulder on the workpiece in which the blind holes are formed.

DESCRIPTION OF PRIOR ART

The U.S. Pat. to Kidd U.S. Pat. No. 2,650,435, Sept. 1, 1953, discloses a multipurpose, two slider depth gauge which can be used to measure the depth of a shoulder in a counterbored blind hole while also measuring the depth of the smaller diameter blind hole itself. The gauge can also measure the depth of a simple blind hole. The gauge of Kidd has an elongate graduated main rule formed with a base portion for engaging the workpiece which portion has transversely therein a shouldered socket. Inserted in the socket is a shouldered bolt having a reduced diameter projecting threaded portion and having a narrow rule and rod receiving passage or slot. The main rule is formed with a V-shaped guiding trough and sliding along the trough in the main rule is a ribbed narrow rule and between guide pins at the main rule base. A cylindrical blind hole depth measuring rod is received in an inverted V-shaped trough formed in the slot in the countersunk bolt with the rod sliding along the outer face of the narrow rule. Both the narrow rule and the rod (or merely the rod alone if the narrow rule is removed) are clamped at the measurement position near the base portion of the main rule by a cup-shaped skirt washer which has V-shaped trough formed in the skirt thereof for engaging the measurement rod and which washer is clamped by a thumb nut threaded to the projecting threaded portion of the countersunk bolt mounted in the main body of the wide rule. The narrow rule can be removed and replaced by the rod.

For gauging the depth of a blind hole adjacent the shoulder of a shouldered workpiece (with the narrow rule removed) the Kidd gauge requires four major components—the grooved main rule with its countersunk bore, the slidably mounted rod, the slotted and grooved clamp bolt, the grooved skirt washer and the clamp nut. The Kidd gauge cannot gauge the depth of such a hole directly from the main rule or body unless the workpiece shoulder is shallow enough to clear the skirt washer.

The U.S. Pat. to Stiriss U.S. Pat. No. 988,672, Apr. 4, 1911, discloses a depth gauge having a base portion formed as an elongate gauge bar which bar has formed therein two rectangular keeper slots. A cylindrical blade can be slid through either keeper slot and is clamped in the stock bar by a splined screw that is longitudinally threaded into the bar. The gauge bar has a transverse opening for receiving a thumb nut threaded to the clamp screw for clamping the cylindrical blade at the measurement position. The Stiriss gauge cannot directly gauge the depth of a blind hole at the shoulder of a workpiece.

SUMMARY OF THE INVENTION

The gauge of the present invention is a combination transfer depth gauge formed preferably as a double-ended gauge which can be employed to directly gauge the depth of small diameter blind holes from a flat face of a workpiece and which can directly gauge the depth of small diameter holes even when they are tangent to or are in close proximity to a shoulder on a workpiece, by taking a measurement from the gauge body. An important feature of the gauge of the present invention lies in the simplicity and economy of manufacture (three simple pieces) so that a plurality of gauges (such as a set of six) can be manufactured and sold at cost that is no more than that of juse on slider gauge of the type disclosed in the aforesaid Kidd patent. The advantages of facilitating the marketing of a set of gauges, in accordance with the present invention, is that the gauges can each employ a different diameter depth gauging wire, the smallest of which may have a diameter as small as 1/32 inch of use in fine work. The gauges of the present invention are so constructed that the depth gauging wire is confined along an offset face portion of the gauge body right down to the flat end face that engages a surface of a shouldered workpiece from which the blind hole is drilled. This confinement of the wire protects it from accidental bending. The gauge is a combination (reversible) gauge and is compact so that it can be utilized while the workpiece is mounted in a drill press or other machine tool. The combination feature resides in the fact that one end of the gauge can be employed for measuring the depth of small diameter blind holes from the flat face of a workpiece or the gauge can be reversed for measuring the depth of small diameter blind holes from the flat offset face of a shouldered workpiece, even though such holes are tangent to or are in close proximity to the workpiece shoulder.

Briefly, the transfer depth gauge of the present invention has only three simple parts. There is a gauge body that is formed of standard bar stock and is relatively short in the direction of measurement. The body has flat, parallel workpiece-engaging faces at its opposite ends. A through-bore is drilled in the body and extends between and is perpendicular to the flat end faces of the body. After drilling the bore, one end portion of the body is milled off to provide an offset face extending parallel to the bore, which offset face is at least substantially tangent to the bore. Preferably the offset face intersects the bore along a minor cord of its circular wall, so that the wall of the bore at the intersection with the offset face encompasses substantially more then 180° (preferably about 270°), for confining a depth gauging rod or wire. The depth gauging rod comprises a small diameter length of steel wire slidably mounted in the bore. The portion of the wire disposed at the offset face is protected and confined by the wall of the bore that extends along the full extent of the offset face. In the preferred form, wherein the offset face intersects the bore, a confined portion of the measuring wire along the offset face is exposed, and can bear against a shoulder on a workpiece.

The steel measuring wire is clamped at the selected gauging position by a simple set screw threaded into the main or non-offset face portion of the gauge body. The setscrew is made of a material (preferably a polyamide such as nylon) that is softer than that of the steel gauging wire so that clamping of the wire does not indent or mar the wire. If the gauging wire were marred or indented by the clamping structure, a second or subsequent depth measurement of holes having a depth substantially equal to that of previously measured holes could be thrown off slightly by a camming action between the clamp and the indentations previously formed in the depth gauging wire.

The machining operations necessary to perform the combination transfer gauge of the present invention are so few and are so quickly and easily performed that a set of gauges having various diameter gauging wires fitted thereto can be provided at a cost that is no more than (and probably less than) the cost of a single double slide rule such as that of the aforesaid Kidd patent.

The manner in which the aforesaid features and advantages of the present invention can be attained will be apparent from the following detailed description of a preferred embodiment of the invention.

BRIEF DESCRIPTION OF THE DRAWINGS

FIG. 1 is a front elevation of a gauge embodying the present invention.

FIG. 2 is a side elevation of the gauge.

FIG. 3 is an enlarged plan view of the gauge looking along the line 3—3 of FIG. 2 and drawn to a scale about four times that of FIGS. 1 and 2.

FIG. 4 is a view like FIG. 1 showing one end of the gauge used to measure the depth of a blind hole in a flat workpiece.

FIG. 5 illustrates how the measurement made in FIG. 4 is transferred to a standard micrometer depth gauge.

FIG. 6 is a side elevation of the gauge in an inverted position from that of FIG. 4 wherein the gauge is employed to measure the depth of a blind hole in a shouldered workpiece.

FIG. 7 is an enlarged section taken on lines 7—7 of FIG. 6, and drawn to the same scale as that of FIG. 3.

FIG. 8 is a fragmentary enlarged view of a portion of FIG. 5.

DETAILED DESCRIPTION

The combination transfer depth gauge G of the present invention is formed of three pieces, a body 10 preferably formed of cylindrical aluminum bar stock, a small diameter depth gauging or measuring wire 12, preferably formed of piano wire or small diameter welding rod and a clamping set screw 14. The body 10 is double ended and is formed as a full section in one end portion 10a and has a milled off or offset end portion 10b. Before the end portion 10b is milled off, the body 10 is drilled longitudinally to provide a through bore 16 that slidably receives the measuring wire 12.

The gauging wire 12 can be reversably slid into the bore 16 and has an end portion 12a having a flat end 13a and an end portion 12b having a pointed end 13b, the latter being best seen in FIG. 8.

A setscrew 14 is mounted in the gauge body 10 by providing a tapped hole 15 that extends through the body and is threaded to receive threads 14a on the thumbscrew 14 (FIG. 3). In order to prevent marring or indentation of the measuring wire 12 by the setscrew, which might throw off subsequent measurements with the wire at about the same position as that of a previous measurement, the setscrew 14 is made from a material that is softer than the wire 12, the preferred material being a polyamide, such as nylon.

To provide the offset end portion 10b, and as seen in FIG. 2 in phantom lines, a longitudinally extending, laterally offset flat face 18 is formed on the end portion 10b by milling off a portion 19 of the gauge body stock parallel to the bore 16. It is an important feature of the present invention that the end portion 10b is milled off so that the resultant offset face 18 is at least tangent to and preferably slightly intersects the through-bore 16 which was first drilled into the body 10. As shown in the enlarged view of FIG. 3, the face 18 of the end portion 10b intersects the throughbore 16 along a minor cord of the circular section of the bore so that the wall 16a of the bore that remains along the offset face 18 includes an angle "a" of about 230 degrees to about 335 degrees, the preferred angle being about 270 degrees. This preferred construction confines the small diameter wire 12 along the full length of the face 18 and minimizes the danger of bending of the wire in service, the preferred construction, which leaves a wire portion 12c exposed (FIG. 7), also makes it possible to abut the wire 12 against a shoulder in a shouldered workpiece, in case the gauge is employed to measure the depth of a hole that is tangent to the shoulder of the workpiece.

The gauge body 10 is double ended and has a flat face 20a at the end portion 10a for measuring the depth of holes where no shoulder problems are provided and an opposed flat face 20b at the opposite or milled off end portion 10b. The aforesaid flat end faces are perpendicular to the axis of the through-bore 16 in the gauge body.

One of the important uses of the transfer gauge of the present invention is that of measuring the depth of blind holes in order to insure they are not drilled deep enough to penetrate through the lower side of the workpiece. As is well known, most metal drills have lip angles forming an included angle of about 120°. The pointed end 13b of the gauge wire 12 is provided in order to sense the full depth of a drilled blind hole. As seen in FIG. 8, the pointed end 13b of the wire 12 is preferably conical and the included angle of the apex angle "b" of the conical end is no greater than 120° and preferably less than that angle to insure that the end will bottom out in the hole. A typical angle "b" for the pointed end of the measuring wire is about 90° but the angle may be as large as 120°. Of course, if the angle "b" is too small, the pointed end may be dulled or rounded off in service and would not reach the full depth of a drilled blind hole. The flat end 13a of the wire is employed to measure the depth of a flat bottomed shoulder or bore.

FIG. 4 shows the gauge of the present invention employed to measure the "d" depth of a blind hole "h" bored from the flat face 22 of a flat workpiece FWP. The workpiece may be bolted to a machine tool table T by conventional clamps C, in accordance with usual machine shop practice. Since the gauge body 10 and the gauging wire 12 can be relatively short, the gauge of the present invention is readily applied to the workpiece while it is still in the drill press or other machine tool employed to machine the workpiece. For example the body 10 can be about 1½" long and the wire 12 can be about 2½" long. The length of the offset face 18 is about half the length of the body 10, namely, about ½" to ¾", the preferred length being ⅝".

When measuring the depth of blind holes, such as the depth of hole "h" in FIG. 4 from a workpiece FWP having a flat upper surface 22, the end portion 10a of the gauge G is employed and the flat end face 20a is positioned against the flat face 22 of the workpiece. After the wire 12 is pushed down through the gauge body until the wire bottoms out in the hole "h", the thumbscrew 14 is tightened and the depth of the hole is measured by transfer, as shown in FIG. 6.

FIG. 5 shows a standard micrometer depth gauge M having an anvil 30 and a movable spindle 32 attached to the conventional thimble 34 threaded to the anvil. FIG. 5 shows how the hole depth "d" (represented by the distance by which the end 12b projects from the end face 20a of the gauge body) is measured. The gauge body 10 can be machined to provide a known distance (such as 1½ inches) between the end faces 20a and 20b. Thus, the hole depth "d" can also be measured by employing conventional outside micrometer or a sliding jaw caliper (not shown) by using the depth measuring rod to make the measurement or by having one jaw engage one end of the gauge body and the other jaw engage the hole depth measuring end of the gauge wire 12 (when taking the known length of the gauge body into account).

FIGS. 6 and 7 show the use of the gauge of the present invention for measuring the depth of a blind hole h' from an offset face 22a, with the hole drilled close to a shoulder 23 (FIG. 7) on a shouldered workpiece SWP. As best seen in FIG. 7, the hole h' is concentric with a partially countersunk wall 24 which may be provided to receive the head of a scrww or the like, in case the hole is to be tapped to receive the screw. For such measurements, the end portion 10b of the gauge is employed and the end face 20b (FIG. 6) is bottomed against the offset face 22a of the shouldered workpiece. The milled off or offset face 18 of the end portion 10b of the gauge makes it possible to position the gauge wire 12 at the shoulder 23 and after the depth of the hole h' is plumbed and the gauge wire 12 clamped by the thumbscrew 14, as before, the depth measurement is made by the use of a standard micrometer depth gauge as in FIG. 6, the depth slide on a caliper, by standard outside micrometer calipers (or even a finely graduated rule if desired), as previously described.

FIG. 7 also shows a blind h" which is tangent to the shoulder 23 on the workpiece SWP. Since the gauge wire 12 preferably protrudes slightly past the offset face 18 of the depth gauge body, the end portion 10b of the gauge can be used to measure the depth of the blind hole h", as shown in FIG. 7.

The gauge wire 12 can be reversed to position the pointed end 13b of the gauge wire for measurement at either end portion 20a or 20b of the gauge body. The gauge body can be machined from standard bar stock by employing only the simplest operations. The throughbore 16 is drilled through the length of the body 10 before the portion 19 (FIG. 2) is milled away from the end portion 10b. The end faces 20a, 20b of the body are machined off square in accordance with standard, simple machine shop practice. So long as it is in the full section body portion 10a, the position of the tapped hole 15 for the setscrew 14 is not critical.

Simple fixtures can be provided for holding the body 10 while it is being drilled and milled off as described, and since the body 10 can be cut off from standard bar stock, such as round aluminum rod ½ inch in diameter, and since the gauge wire 12 can be made out of a length of standard piano wire, small diameter welding rod or the like, the cost of making a single gauge having a single diameter measuring wire is very low. Thus, a set of several gauges (such as 6) having gauge wire diameters of 1/32 (0.031) inches to 7/64 (0.109) inches in 1/64 inch steps can be provided at a cost which is no more than or possibly less than the cost of a complex rule gauge such as that of the aforesaid Kidd patent. Because of the confinement of the wire at the end portion 10b by the partially relieved or laterally offset throughbore portion 16a (FIG. 3), even the smallest diameter measuring wire, such as a wire having a diameter of only 1/32 inches is protected from the end face 20b of the gauge. In addition to the above, the inherent ability to make the gauge compact, that is short in length and small in diameter, facilitates the insertion of the gauge for the taking of measurements in the blind holes formed in workpieces while the workpiece is still mounted in the machine tool, such as a drill press or the like.

Although the best mode contemplated for carrying out the present invention has been herein shown and described, it will be apparent that modification and variation may be made without departing from what is regarded to be the subject matter of the invention as defined in the appended claims.

What I claim is:

1. A transfer gauge for measuring the depth of a bore or the like formed in a workpiece, said gauge being of the type having a single body, a planar measurement reference face at one end of said body, a single depth gauging rod, an elongate guide recess for said rod formed in said body for slidably receiving said gauging rod and means for clamping said gauging rod to said body; the improvement wherein said gauge is capable of directly gauging the depth of a round walled bore from a workpiece face, wherein the workpiece has an upstanding shoulder that projects outwardly from said workpiece face and wherein the shoulder is tangent to a wall of the bore; said guide recess being a round walled longitudinal through-bore formed in said body, said bore being perpendicular to said planar end reference face of the body, one end portion of said body being relieved to provide a shoulder-clearing face that extends parallel to said bore and that intersects said bore along a minor chord of the round wall of the bore so that the wall of said bore encompasses more than 180°; said gauging rod comprising a single length of rod steel wire having an end slidable past said body reference face, the minor segment of the longitudinal extent of the wire that is disposed along said shoulder-clearing face of the body being confined by the wall of said bore but being exposed and projecting past said face, the relationship between said exposed minor segment of the wire and the relieved face of the body being such that a plane tangent to the exposed segment of the wire and tangent to said body at one side of the wire clears the body at the other side of the wire, said clamping means comprising a set-screw threaded into the other, unrelieved end portion of said body.

2. The gauge of claim 1; wherein said shoulder-clearing face of the body has a flat planar surface.

3. The gauge of claim 1; wherein the wall of said bore at said shoulder-clearing face includes an angle of about 230° to about 340°.

* * * * *